United States Patent
Boss et al.

(10) Patent No.: US 8,832,823 B2
(45) Date of Patent: Sep. 9, 2014

(54) USER ACCESS CONTROL BASED ON HANDHELD DEVICE ORIENTATION

(71) Applicant: International Business Machines Corporation, Armonk, NY (US)

(72) Inventors: Gregory J. Boss, Saginaw, MI (US); James R. Kozloski, New Fairfield, CT (US); Clifford Alan Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/693,994

(22) Filed: Dec. 4, 2012

(65) Prior Publication Data

US 2014/0157402 A1    Jun. 5, 2014

(51) Int. Cl.
G06F 21/00    (2013.01)

(52) U.S. Cl.
USPC ................................... 726/16; 726/5; 726/17

(58) Field of Classification Search
None
See application file for complete search history.

(56) References Cited

U.S. PATENT DOCUMENTS

| | | | |
|---|---|---|---|
| 6,721,738 B2 | 4/2004 | Verplaetse et al. | |
| 7,000,116 B2 | 2/2006 | Bates et al. | |
| 8,099,124 B2 | 1/2012 | Tilley | |
| 2008/0184360 A1 | 7/2008 | Kornilovsky et al. | |
| 2010/0064359 A1* | 3/2010 | Boss et al. | 726/7 |
| 2011/0093723 A1 | 4/2011 | Brown et al. | |
| 2012/0117643 A1 | 5/2012 | Orr | |
| 2012/0164978 A1 | 6/2012 | Conti et al. | |
| 2012/0204257 A1 | 8/2012 | O'Connell et al. | |
| 2012/0235790 A1* | 9/2012 | Zhao et al. | 340/5.83 |

OTHER PUBLICATIONS

Lin, C.C., et al., "A New Non-Intrusive Authentication Method based on the Orientation Sensor for Smartphone Users," 2012 IEEE Sixth International Conference on Softwear and Reliability, 978-0-7695-4742-8/12, copyright 2012 IEEE, DOI 10.1109/Sere.2012.37.

Patel, S.N., et al., "A Gesture-Based Authentication Scheme for Untrusted Public Terminals," UI ST '04, Oct. 24-27, 2004, Sante Fe, New Mexico, USA, copyright 2004 ACM-58113-957-08/04/0010, vol. 6, issue 2.

Dueck, S., "Handwavey: A Gestural Motion Password Interface," Proceedings of Human Interface Technologies 2010/11 Fall Conference, HIT2010, Dec. 13, 2010, Vancouver BC.

Non Final Office Action dated Dec. 31, 2013 for U.S Appl. No. 14/030,498.

* cited by examiner

Primary Examiner — Gilberto Barron, Jr.
Assistant Examiner — Simon Kanaan
(74) Attorney, Agent, or Firm — Jon A. Gibbons; Fleit Gibbons Gutman Bongini & Bianco PL (57) ABSTRACT

Disclosed is a novel system, computer program product, and method for allowing access to an application on a handheld device. This is also known as logging on or password entry. The method begins with detecting a change in at least one of orientation and position of a handheld device relative to a given plane. At least one of a keyboard, a touch screen, a gesture, and voice recognition engine input is received. Based on a combination of the at least one of orientation and position of the handheld and the user input received matching a previously stored value, unlocking access to an application running on the handheld device. The detecting of the change in orientation or position or both can occur simultaneously with the user input or previous to the user input or after the user input.

12 Claims, 4 Drawing Sheets

USER ACCESS CONTROL BASED ON HANDHELD DEVICE ORIENTATION

BACKGROUND

The present invention relates to user access control to computers, and more specifically to user access control on a handheld device using sensors responsive to acceleration or orientation or both.

Handheld devices often times include components which signal a change in position of the device relative to the earth's gravity. This change of orientation is often used by software executing on the device.

The miniaturization of handheld devices is a challenge. This challenge is especially difficult when miniaturizing user interface devices such as keyboards. When keyboards become too small, they become difficult to use, especially to users with large hands or the elderly often with limited finger dexterity.

In computer security, a login or logon refers to the credentials required to obtain access to a computer system or other restricted area, such as an application running on the computer system. The term "logging in", "logging on", "signing in", or "signing on" is the process by which individual access to a computer system is controlled by identifying and authenticating the user through the credentials presented by the user. Common login processes are a password sometimes used in combination with a username. The miniaturization of user interface on handheld devices makes this process difficult.

BRIEF SUMMARY

Disclosed is a novel system, computer program product, and method for allowing access to an application on a handheld device. This is also known as logging on or password entry. The method begins with detecting a change in at least one of orientation and position of a handheld device. At least one of a keyboard, a touch screen, a gesture, and voice recognition engine input is received. Based on a combination of the at least one of orientation and position of the handheld and the input received matching a previously stored value, unlocking access to an application on the handheld device. The detecting of the change in orientation or position or both can occur simultaneously with the user input or previous to the user input or after the user input.

In one example, the change in orientation is from landscape to portrait and the change in position is shaking within a plane. The amplitude and frequency of the change in orientation or position may be used to determine if it meets a previously set threshold. Indicators such as avatars, cursors, and bulls-eye levels can be used to provide feedback to the user. A virtual keyboard along with a touch screen can be used for user input.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

As used herein, a "gesture" is defined as accelerating, repositioning, tilting, shaking, or otherwise moving the handheld device to cause a change of a position of the device itself, as opposed to motions made on a touch screen using a hand, finger, stylus or other object.

A "bull's eye level" is a type of level that allows for leveling of planes in two directions. Like a tubular level, a bubble in a liquid medium is free to move about within an enclosed container. However, unlike a tubular level which permits leveling in only one direction, in the bull's eye level, the bubble is free to move along both an x and y direction of a given plane. The bubble, having less density than the surrounding liquid medium rises to the top of the liquid surface. The behavior of the bull's eye level is emulated in a handheld device, using sensors to determine the orientation of the device relative to the earth's gravity. For example, tilting the handheld device changes a location of the normalized surface of the simulated liquid, and accordingly, a cursor moves in a direction to the top of the simulated liquid surface.

"Orientation" is used to describe a position of the handheld device relative to the earth's gravity. A change in the orientation of the device changes the cursor or position indicator which is programmed to model a bubble in a bull's eye level. In various examples, a device orientation is able to be changed by tilting the device by, for example, rotating the device about one or more physical axes.

The term "indicator" is a cursor or other positioning reference and in one example is programmed to model a bubble in a bull's eye level based on the origination of the handheld device.

A "graphical object" is any text, picture, or combination capable of being displayed on a handheld device. The graphical object comes into "contact" with the indicator when the images overlap or come within a predefined distance of each other. This distance may be settable by a user.

"Characteristic", such as, a characteristic of an avatar is any visually or audibly feature or appearance including a position, a posture, articles of clothing, hair, eye, eye movement, voice, sound, or facial expression. The purpose of the characteristic is to enable a user to notice a given state of the avatar.

Axis of rotation in these examples can be any axes of rotation of the handheld device including a principle axis of rotation along an x, y, or z axis. A longitudinal axis (x), or roll axis, is an axis drawn from the right side of the handheld device to the left of the handheld device parallel to the display. A lateral axis, or pitch axis (y), is an axis running from the top to bottom side of the handheld device parallel to the display. A vertical axis (z), or yaw axis, an axis drawn from top to bottom perpendicular to the ground and to the display of the handheld device, if the handheld device were held parallel to the ground (e.g., laying flat on a surface). These principle axes of rotation are shown in FIGS. 1-3.

Figure 4:
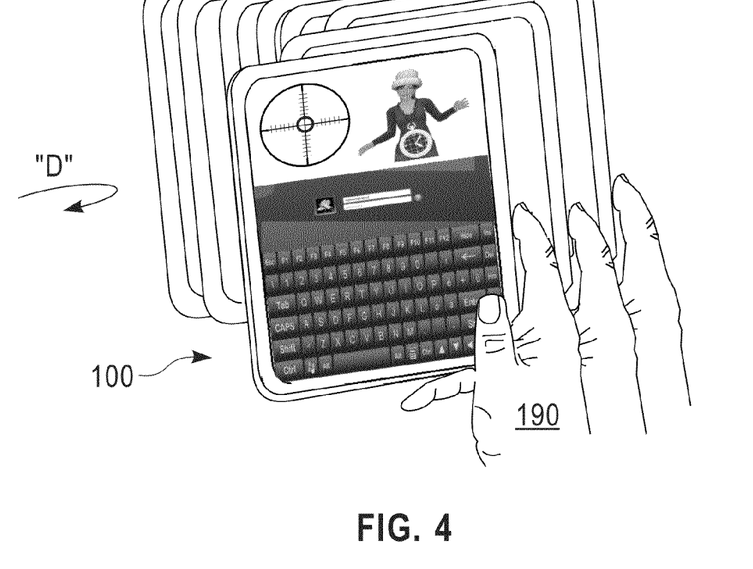
FIG. 4 illustrates an example a shaking gesture with a handheld device.

The term "x-y planar" means movement along a plane typically co-planar to the display of a handheld device as shown in FIG. 4.

Figure 1:
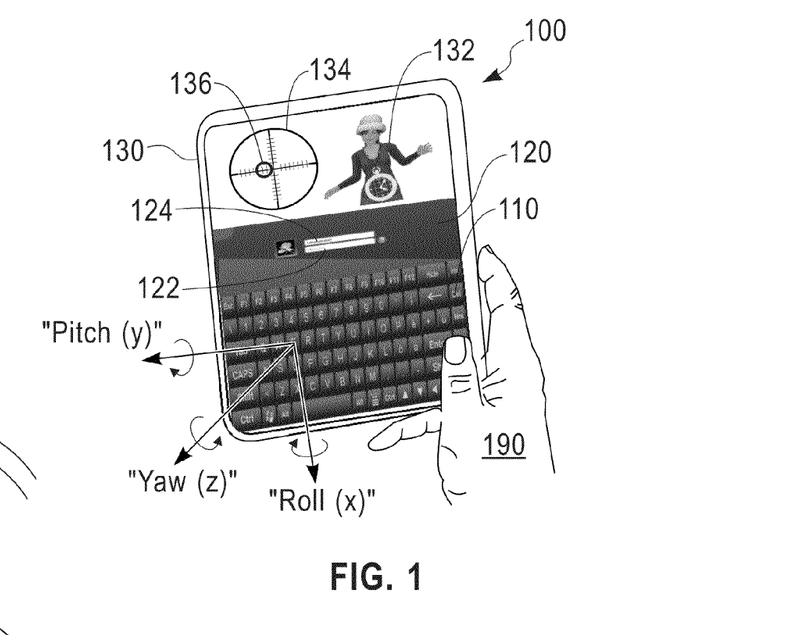
FIG. 1 illustrates an example longitudinal or roll axis tilting gesture with a handheld device.
Figure 2:
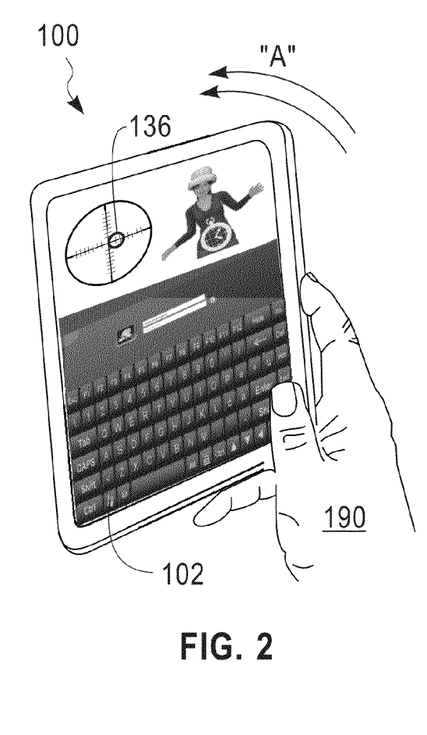
FIG. 2 illustrates an example longitudinal or roll axis tilting gesture with a handheld device in a first direction.
Figure 3:
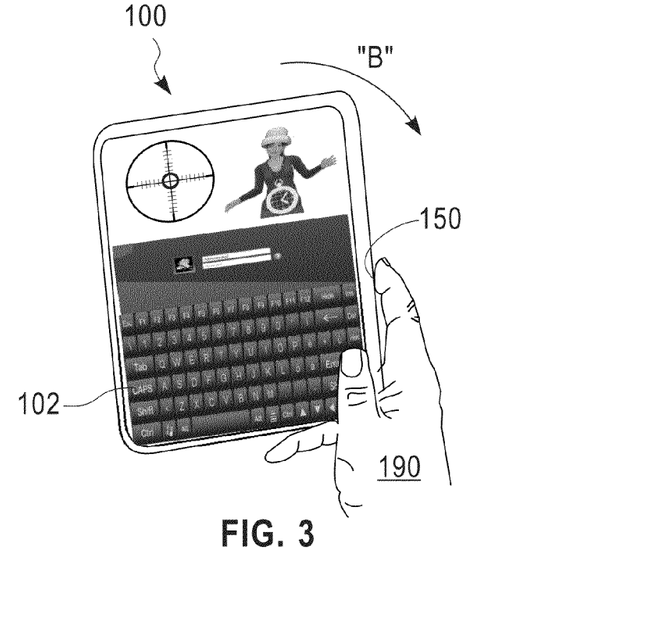
FIG. 3 illustrates an example longitudinal or roll axis tilting gesture with a handheld device in a second direction.

With reference to FIGS. 1-3, a handheld device 100 is shown having a display 102 upon which an indicator, such as a cursor or an indicator 134, may be depicted.

While the handheld device 100 is depicted as a tablet computer, it is important to note that other forms of handheld devices may be used including wireless phones, handheld computers; ebook readers; portable computers; and laptop computers; or any other handheld device which requires or utilizes human input in the form of gestures. The handheld device includes a display 102, for example an LCD screen. The handheld device is sufficiently light to be held by a single hand of a user 190.

Display 102 displays information and indicia as determined by software executing upon one or more processors as further described below associated with display 102. Shown are three distinct graphic regions being displayed. A first graphic region includes a virtual keyboard 110. In another example a mechanical keyboard or buttons can be used instead of a virtual keyboard 110. A second graphic is sign-in or logon screen 120 showing a username field 124 and password field 122. The second graphic is optional and used to provide feedback to a user. A third graphic region 130 is to denote relative positions of the electronic device 100. This region is also optional as are its contents. Shown is a bulls-eye type level 134 with the indicator 136 that change depending on the relative position or orientation, or both, of the handheld device 100. Each of the features in the third graph region 130 is optional. Using software executing with a processor within handheld device 100, bulls-eye type level 134 is changed based upon a simulation of various aspects of physics, whereby a virtual floating bubble having movements which are similar, at least in part, to a real world floating bubble. More particularly, by imitating behavior of a real world bubble the indicator 134 moving within or relative to the bull-eye type level, a user 190 of handheld device 100, who is naturally familiar with the behavior of bubbles in liquid, anticipates how cursor 104 moves as handheld device 100 is tilted. Accordingly, user 190 readily learns and quickly masters this aspect of cursor movement in the use of handheld device 100. In another example, and one or more characteristics of the avatar 132 changes with relative position or orientation or keyboard input, or a combination thereof.

Movement of handheld device 100, including the sensing of acceleration or a change in orientation or angular disposition of handheld device 100 relative to the earth is sensed by a sensor further described below.

Herein, a resting or starting angular disposition, or a normal orientation of device 100, is defined to indicate a starting orientation. This starting orientation typically represents a comfortable orientation for both viewing and manipulating the handheld device 100 by a user. A normal orientation may represent an orientation or angular disposition of any angle, including an orientation that is flat, perpendicular, or at a fixed angle relative to gravitational forces. A normal orientation is periodically recalculated, to accommodate a shift in user position, or passing of the handheld device 100 to a different user. An average normal orientation may be calculated by an observing angle of the handheld device 100 over an amount of time. For example, the normal or resting orientation is determined by averaging multiple orientation samples during either a brief or extended time interval prior to initiating movement of the handheld device 100, or by selecting an actuator such as a button. A simulated liquid upper level is normalized relative to the established normal orientation. In an example, software executing within handheld device 100 enables user 190 to establish a normal orientation, accessible through a menu or displayed configuration interface, or through a dedicated physical button or hardware control of a calibration menu (not shown).

Establishing a normal orientation calibrates handheld device 100 for a baseline from which subsequent moves are carried out. Calibration may also be performed using an option or menu on the display, where moving the indicator to a predefined region of the display is carried out, independent of an orientation of the handheld device, and a current orientation of the handheld device as defined as being level within the current orientation.

The indicator or cursor simulating the action of a bubble in a liquid mimics a bull's eye level. The roll (x) tilting of the handheld device 100 in FIGS. 1-3 changes a location of the normalized surface of the simulated liquid, and accordingly, cursor 136 simulating the bubble in the bull's eye level 134, correspondingly moves in the display 102. This movement and new location of the indicator 136 is shown in FIG. 2, where handheld device 100 is tilted so that a left side of the handheld device 100, as viewed, is lowered relative to a normal orientation of handheld device 100. Accordingly, cursor 136 moves right of the bulls-eye level 134. Arrows "A" indicate a direction of tilting or rotation of handheld device 100, to cause cursor 136 to move right. In FIG. 2, the position of cursor 136 in the bulls-eye bubble 134 has visibly changed, providing user feedback, in response to movement of the handheld device 100.

In one example, indicator 136 simulates movement of the bubble in the bull's eye level 134 as if the inside surface of the display 102 was not flat. In this example, the indicator 136 simulates the air bubble in a bull's eye level 134 with a convex or concave surface of the display 102 to produce a non-linear movement across the display 102.

When handheld device 100 is held horizontal in both a length (y) and a width (x) axis, such that an axis normal to the screen (z) is vertical, the indicator 136 that simulates movement of the bubble in the bull's eye level 134 moves to the middle of the display 102. If handheld device 100 is rotated such that the top of display 102 is raised, and the bottom of display 102 is lowered (i.e. rotated about the x axis), the indicator 136 would move toward the top of display 102. If handheld device 100 is rotated such that the left side of handheld device 100 is raised and the right side is lowered (i.e. rotated about the y axis), the indicator 136 would move toward the left side of display 102. Likewise, the cursor 104 would move toward the right if the right side is raised above the left side. The rotational angle of handheld device 100 in x, y, z space determines how far the indicator 136 moves away from a middle of the bulls-eye level 134. Compound rotations cause the indicator 136 to move into a quadrant (e.g., either upper left, upper right, lower left or lower right), a distance in both the left right and top bottom axes proportional to the respective rotations in those directions. Simultaneously rotating handheld device 100 about x and z axes would cause the same effect as rotating it about the x and y axes since, in both cases, the plane of the screen would change such that one corner would be raised above the others and the corner opposite would be lowered below the other corners.

Movement of the indicator 104 may be terminated in a variety of ways, including a combination of methods. In one example, and with reference to FIG. 3, handheld device 100 has been tilted back to a normal viewing angle, shown by arrow "B", indicating to software associated with handheld device 100 that movement of cursor 136 should be stopped. In another example, user 190 tilts handheld device 100 in a direction opposite the direction of tilting causing cursor movement, but to a lesser extent and for a shorter duration, thereby indicating to software that cursor movement should be stopped or slowed. The extent of tilting and duration is a predetermined threshold, which may be set, for example, by the user. Alternatively, the threshold may be preset based on characteristics of the handheld device 100. Subsequent tilting motions may then be employed to once again cause movement and adjustment of a position of cursor 136. Referring to FIGS. 2 and 3, a single arrow "B" is illustrated, relative to the double arrow "A", to indicate the extent of tilting for arrow "B" may be less than an extent or rate of tilting for arrow "A", in order to terminate movement.

In a further example, the indicator 136 movement within the bulls-eye level 134 does not begin until handheld device 100 is triggered or enabled for cursor 136 movement within the bulls-eye level 134, for example by tilting handheld device 100 at a rotational angle that is changed relative to a normal angle. More particularly, a change from a normal angle, along any axis, of more than a particular minimum rotational angle, triggers initiation of cursor 136 movement within the bulls-eye level 134. Once the indicator 136 movement begins, handheld device 100 may then be tilted to or rotated to an angle which would cause the indicator 136 movement to imitate the rate and direction of the bubble in the bull's eye level 134.

In yet another example, movement of the indicator 136 within the bulls-eye level 134 is triggered by pressing a physical button. The physical button 150 is disposed on the exterior of handheld device 100. Another example is pressing a "soft" button such as an icon on display 102 or executing a cursor click upon display 102. Other commands, including voice commands to handheld device 100, may be used as well. Alternatively, cursor 136 movement within the bulls-eye level 134 may be initiated or terminated by shaking the handheld device 100, discussed further below.

In a further example, movement of the indicator 104 may be terminated by rotating or tilting handheld device 100 to an orientation past a normal orientation in a direction opposite to, or away from, the direction of cursor movement. Alternatively, movement of handheld device 100 in a shaking motion in a z axis perpendicular to the geometric plane of the display 102 may initiate or terminate the indicator 136 movement within the bulls-eye level 134. The viscosity of the simulated liquid, resulting in a corresponding behavior of the indicator 104, is determined, for example, by user's settings in the software. As an example, the response rate of the indicator 136 may be adjustable by the user, to simulate a lower viscosity for faster indicator 136 movement, or a higher viscosity for slower indicator 136 movement.

While the indicator 136 has the form of a bubble in a liquid in the illustrations, it should be understood that the indicator 136 may have any appearance, for example a pointer, crosshairs, or any known cursor shape, and may have either a two or three dimensional appearance, while operating in a manner similar to that described above.

In addition to moving the indicator 136 through rotating, tilting, flicking, shaking, dragging, or any other method mentioned herein, the indicator 136 may additionally be moved, and objects selected, through the use of a trackpad, trackball, optical navigation mouse, joystick, touchscreen, or any other human interface device or combination thereof.

Acceleration of the indicator 136 corresponds to an acceleration of handheld device 100. The correlation may be direct, proportional in magnitude, or related in accordance with a mathematical formula, for example an extent of rotation or tilting. Similarly, movement of the indicator 136 may correlate with a magnitude of acceleration of handheld device 100. A combination of acceleration and orientation, and/or a rate of each attribute, for example a speed and/or extent of tilting during acceleration, may produce a unique result relative to either acceleration or orientation alone. One advantageous result is controlling a rate of cursor 136 movement during a tilting gesture.

FIG. 4 illustrates an example of a shaking gesture with a handheld device 100. In this example the handheld device 100 is held horizontal in both a length (y) and a width (x) axis, such that an axis normal to the screen (z) is vertical. The user shakes the handheld device 100, first to the right and then to the left as shown by Arrow "D". In this example, the shaking substantially within the x-y plane the indicator 136 in the bull's eye level 134 would be stationary or move very little. The exact profile of the shaking gesture can include a user defined threshold for amplitude, frequency, or both.

Figures 5, 6:
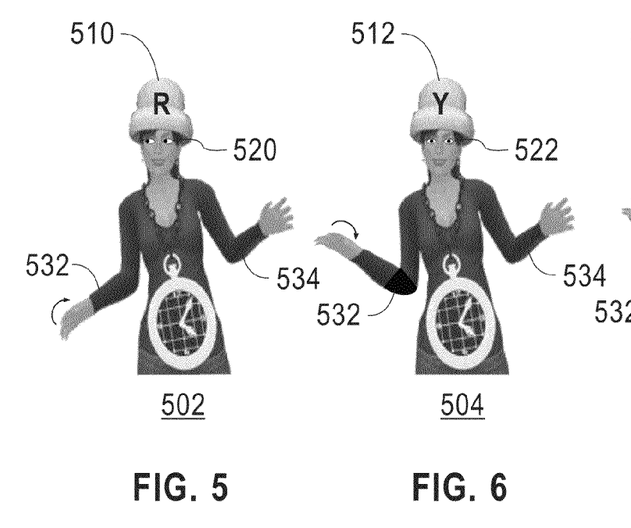
FIG. 5 illustrates an avatar with changing one or more characteristics presented on a handheld device.
FIG. 6 illustrates an avatar with changing one or more characteristics from FIG. 5 presented on a handheld device.
Figure 7:
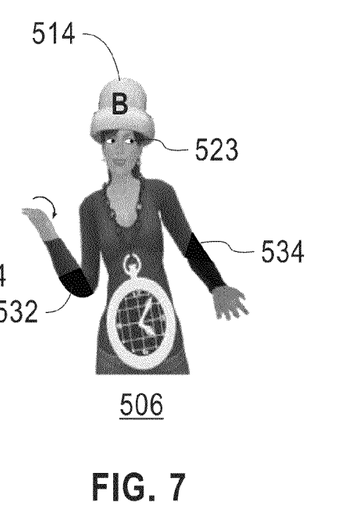
FIG. 7 illustrates an avatar with changing one or more characteristics from FIGS. 5-6 presented on a handheld device.

Turning to FIGS. 5-7, shown is an avatar 502 with changing characteristics presented on a handheld device 100. The avatar 502 in FIG. 5 has her right hand 532 lower that her left hand 534, her eyes 520 looking toward her left, and a red hat 520. Continuing further, the avatar 504 has her right hand 532 and her left hand 534 at almost the same height, her eyes 522 looking straight forward, and a yellow hat 522. The avatar 514 in has her right hand 532 and her left hand 534 at almost the same height, her eyes 520 looking toward straight forward, and a yellow hat 520. Continuing still further, the avatar 506 has her right hand 532 higher than her left hand 534, her eyes 523 looking towards her left, and a blue hat 514. Although multiple different characteristics of the avatar 502, 504, 506 are described and shown, only one characteristic may change at a time.

Figure 8:
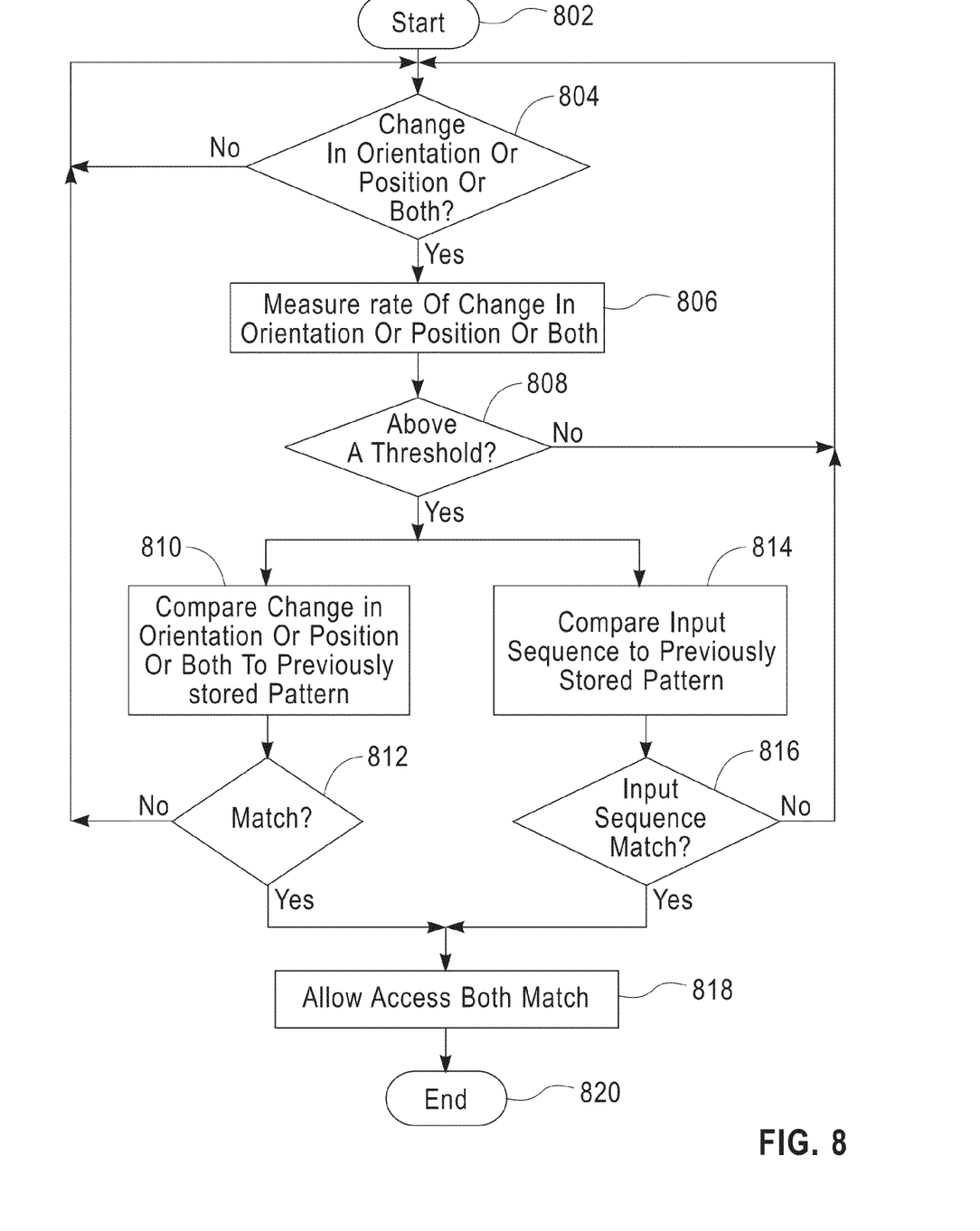
FIG. 8 is a flow diagram of allowing access to an application on a handheld device using a change in orientation, or a change in position, or both, in combination with other input from the user.

FIG. 8 is a flow diagram of allowing access to an application on a handheld device using a change in orientation, or a change in position, or both, in combination with other input from the user. The process starts in step 802 and immediately determines a change in device orientation, or a change in position, or both. Upon a detecting a change in device orientation, or a change in position, or both, the rate of change in orientation or position is or both is measured in step 808. If the is not above a predetermined threshold in step 808, the process loops back to step 804. The predetermined threshold can be set by the user through a settings program, or preferable when the recording a combination of change in orientation or position is or both, in combination with the user input when setting up the access or password. The purpose of the threshold is to filter out any orientation and positional changes of the handheld device that may be a result of normal use as opposed to logging in with a password. For example rotating over 70 degrees about an axis would above a threshold i.e. rotating from portrait to landscape or vice-versa, however, below this threshold would be ignored for the purpose of gaining access to an application.

Once a change in orientation or position is or both above a predetermined threshold two parallel paths are followed. The first path is step 810 to compare orientation or position is or both of the handheld device. If a match to a previously stored value is identified, the process continues to step 818. Otherwise, a match is not found the process loops back to step 804. The second path is step to compare key sequence 814. If a match to a previously stored value is identified, the process continues to step 818. Otherwise, a match is not found the process loops back to step 804. In step 818 when both a match to an input sequence from step 816 and a match to orientation or position is or both from step 812, then access to an application is granted. The application can be a logon application, access to a media file, unlocking the handheld device, or any other application need user authentication.

Although the process flow for steps 810, 812 and 814, 816 are shown in parallel, in one embodiment, the comparisons do not happen simultaneously but rather sequentially. For example, rotate a handheld device from a portrait to a landscape mode following by user input of a keyboard entry, voice entry or touch screen gesture. In another embodiment, the user input happens prior to the change in the orientation or position is or both of the device. While in another example, they happen substantially simultaneously.

Table I illustrates various combinations of changes in orientation or position is or both of the handheld device, along with user input types, indicator type, and timing. In a first example a user may have setup an orientation from landscape-to-portrait along with a key sequence to allow user access to an application. The timing whether the rotation and input occurs simultaneously or sequentially is not differentiated to enable access. Sequentially could be rotating first and then followed by keyboard input or vice versa.

In a second example, shaking the handheld device in a plane followed-by voice input with a bulls-eye level is used for access to an application. Sequentially could be defined as first shaking followed by voice input or vice versa.

In a third example, rotating the handheld device about a given axis and a button press is used to provide access to an application. Again, sequentially could be defined as first shaking followed by voice input or vice versa. To setup one of these examples, the user may go through a settings page or enter logon information in which the specific orientation/position, input, indicator and timing is recorded. When the previously recorded orientation/position and input are matched, user access to an application is granted.

TABLE I

| ORIENTATION/POSITION | INPUT | INDICATOR | TIMING |
|---|---|---|---|
| Landscape-to-Portrait | Key Sequence | Avatar | Any |
| Shaking In A Plane | Voice | Bulls-Eye | Sequentially |
| Rotating About An Axis Motion | Button | None | Sequentially |
| ... | ... | ... | ... |

Figure 9:
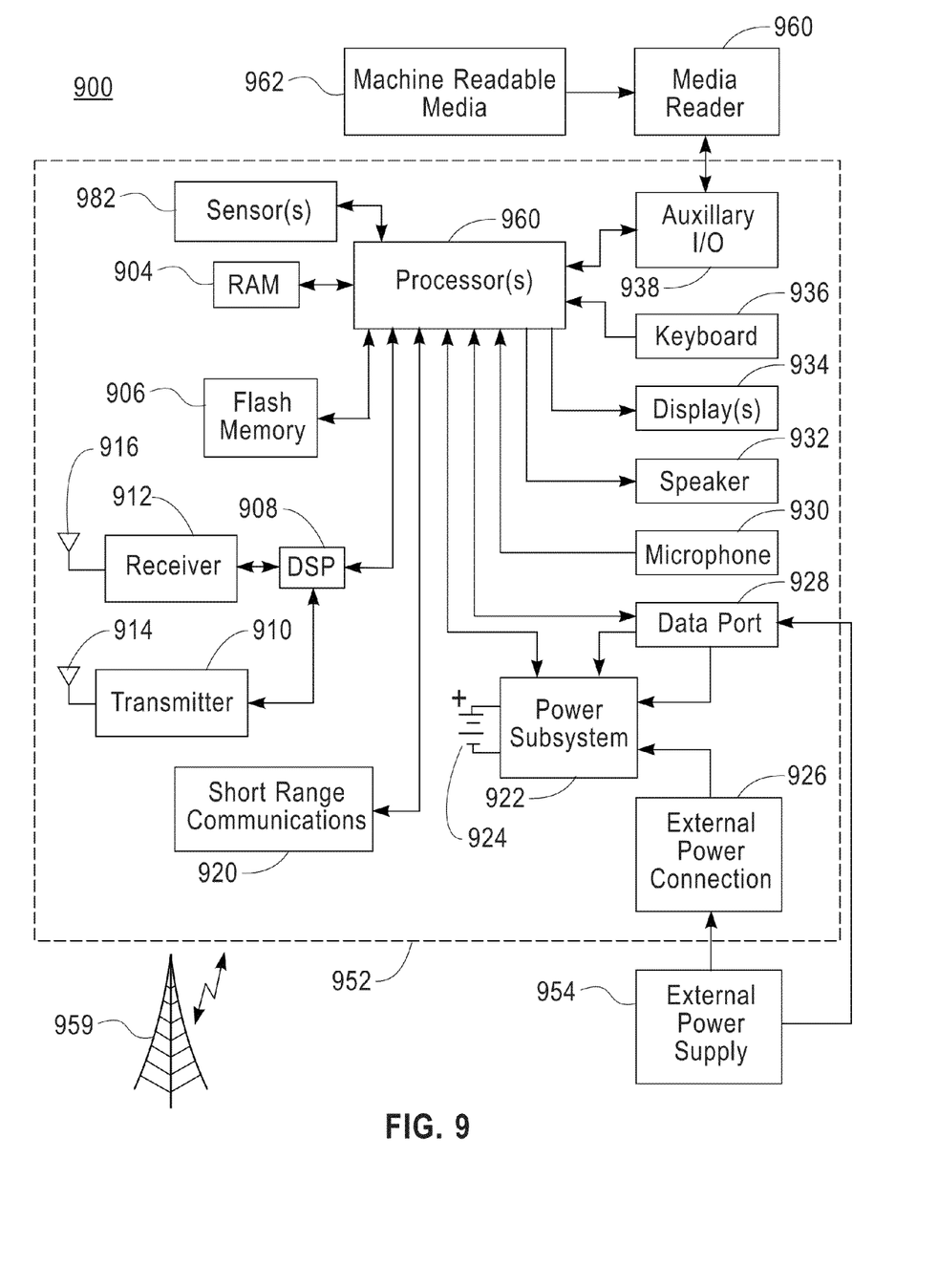
FIG. 9 is a block diagram of an example handheld device.

FIG. 9 is an example handheld device 900 that includes two-way wireless communications functions. Such handheld devices incorporate communication subsystem elements such as a wireless transmitter 910, a wireless receiver 912, and associated components such as one or more antenna elements 914 and 916. A digital signal processor (DSP) 908 performs processing to extract data from received wireless signals and to generate signals to be transmitted. The particular design of the communication subsystem is dependent upon the communication network and associated wireless communications protocols with which the device is intended to operate.

The handheld device 900 includes a microprocessor 902 that controls the overall operation of the handheld device 952. The microprocessor 902 interacts with the above described communications subsystem elements and also interacts with other device subsystems such as non-volatile or flash memory 906, random access memory (RAM) 904, auxiliary input/output (I/O) device 938, data port 928, display 934, keyboard 936, speaker 932, microphone 930, a short-range communications subsystem 920, a power subsystem 922, and or any other device subsystems.

One or more sensors 982 are incorporated into or coupled with handheld device. The sensor 982 is operative to sense such movement by any sensing device currently known and understood within the relevant art, or hereinafter invented. Examples of sensor 982 include one or more accelerometers, G-force meter, gravimeter, gradiometer, inclinometer, clinometer, tiltmeter, micro electro-mechanical system (MEMS), compass, or the like, using any known technology, including liquid capacitive, piezoelectric, piezoresistive, piezoceramic, or other technology currently known and understood within the relevant art, or hereinafter invented. Such devices or technology enable the conversion of movement information to an electric signal that is interpreted by microprocessor 902.

Pairs or triplet combinations, or bi-axial or tri-axial implementations of sensor 982 may are used for detecting movement in two or three dimensions. Sampling rates of sensor 982 are selected to balance cost and other factors, with a requirement for the perception of responsiveness and smooth movement desired for a user. One or more accelerometers may provide information regarding a rate of speed or acceleration of a handheld device, and may also provide information pertaining to orientation of the handheld device 900, as well. Algorithms or software which may be executed by microprocessor 902, for converting spatial, coordinate, or other reference information embedded within such electric signal, to an angular orientation of the sensing device and/or an orientation of a device into which the sensing device is connected or associated, is understood by one skilled in the relevant art.

A battery 924 is connected to a power subsystem 922 to provide power to the circuits of the handheld device 952. The power subsystem 922 includes power distribution circuitry for providing power to the handheld device 900 and also contains battery charging circuitry to manage recharging the battery 924. The power subsystem 922 includes a battery monitoring circuit that is operable to provide a status of one or more battery status indicators, such as remaining capacity, temperature, voltage, electrical current consumption, and the like, to various components of the electronic handheld 900.

The data port 928 is able to support data communications between the handheld device 900 and other devices through various modes of data communications, such as high speed data transfers over optical communications circuits or over electrical data communications circuits such as a USB connection incorporated into the data port 928 of some examples. Data port 928 is able to support communications with, for example, an external computer or other device.

Data communication through data port 928 enables a user to set preferences through the external device or through a software application and extends the capabilities of the device by enabling information or software exchange through direct connections between the handheld device 952 and external data sources rather then via a wireless data communication network. In addition to data communication, the data port 928 provides power to the power subsystem 922 to charge the battery 924 or to supply power to the electronic circuits, such as microprocessor 902, of the handheld device 900.

Operating system software used by the microprocessor 902 is stored in flash memory 906. Further examples are able to use a battery backed-up RAM or other non-volatile storage data elements to store operating systems, other executable programs, or both. The operating system software, device application software, or parts thereof, are able to be temporarily loaded into volatile data storage such as RAM 904. Data received via wireless communication signals or through wired communications are also able to be stored to RAM 904.

The microprocessor 902, in addition to its operating system functions, is able to execute software applications on the handheld device 900. A predetermined set of applications that control basic device operations, including at least data and voice communication applications, is able to be installed on the handheld device 900 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the handheld device 900 through, for example, the wireless network 950, an auxiliary I/O device 938, data port 928, short-range communications subsystem 920, or any combination of these interfaces. Such applications are then able to be installed by a user in the RAM 904 or a non-volatile store for execution by the microprocessor 902.

In a data communication mode, a received signal such as a text message or web page download is processed by the communication subsystem, including wireless receiver 912 and wireless transmitter 910, and communicated data is provided the microprocessor 902, which is able to further process the received data for output to the display 934, or alternatively, to an auxiliary I/O device 938 or the data port 928. A user of the handheld device 952 may also compose data items, such as e-mail messages, using the keyboard 936, which is able to include a complete alphanumeric keyboard or a telephone-type keypad, in conjunction with the display 934 and possibly an auxiliary I/O device 938. Such composed items are then able to be transmitted over a communication network through the communication subsystem.

For voice communications, overall operation of the handheld device 900 is substantially similar, except that received signals are generally provided to a speaker 932 and signals for transmission are generally produced by a microphone 930. Alternative voice or audio I/O subsystems, such as a voice message recording subsystem, may also be implemented on the handheld device 900. Although voice or audio signal output is generally accomplished primarily through the speaker 932, the display 934 may also be used to provide an indication of the identity of a calling party, the duration of a voice call, or other voice call related information, for example.

Depending on conditions or statuses of the handheld device 900, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 920 provides for data communication between the handheld device 952 and different systems or devices, which need not necessarily be similar devices. For example, the short-range communications subsystem 920 includes an infrared device and associated circuits and components or a Radio Frequency based communication module such as one supporting Bluetooth® communications, to provide for communication with similarly-enabled systems and devices, including the data file transfer communications described above.

A media reader 960 is able to be connected to an auxiliary I/O device 938 to allow, for example, loading computer readable program code of a computer program product into the handheld device 900 for storage into non-volatile memory such as flash memory 906. One example of a media reader 960 is an optical drive such as a CD/DVD drive, which may be used to store data to and read data from a computer readable medium or storage product such as computer readable storage media 962. Examples of suitable computer readable storage media include optical storage media such as a CD or DVD, magnetic media, or any other suitable data storage device. Media reader 960 is alternatively able to be connected to the electronic device through the data port 928 or computer readable program code is alternatively able to be provided to the handheld device 900 through the wireless network 950.

Although specific examples of the subject matter have been disclosed, those having ordinary skill in the art will understand that changes can be made to the specific examples without departing from the spirit and scope of the disclosed subject matter. The scope of the disclosure is not to be restricted, therefore, to the specific examples, and it is intended that the appended claims cover any and all such applications, modifications, and examples within the scope of the present disclosure.

What is claimed is:

1. A method of allowing access to a user of a handheld device, the method comprising:

detecting a change in rotation between a landscape and portrait position of a handheld device relative to a given plane;

receiving input, after rotating the handheld device, from at least one of a keyboard, a touch screen, a gesture, and voice recognition engine; and based on a combination of the position of the handheld and the input received matching a previously stored value, unlocking access to an application running on the handheld device.

2. The method of claim 1, further comprising:
displaying a first indicator upon a display of the handheld device;
moving the first indicator across the display relative to a second indicator, in response to the change in the position of the handheld device relative to the given plane; and
determining when the first indicator corresponds to a value which is within a threshold of a password value for a period of time.

3. The method of claim 1, further comprising:
displaying an avatar upon a display of the handheld device; and
updating at least one characteristic of the avatar in response to the input received.

4. The method of claim 3, wherein the updating the at least one characteristic of the avatar in response to the input received, includes updating at least one characteristic of clothing, hair, eyes, gesture, position, and posture.

5. The method of claim 3, wherein the unlocking access to the application running of the handheld device includes unlocking access to the application running on the handheld device based on the at least one characteristics of the avatar.

6. The method of claim 1, further comprising:
displaying a virtual keyboard upon a display of the handheld device; and
updating at least one characteristic of the virtual keyboard in response to the change in the position of the handheld device relative to the given plane.

7. The method of claim 6, wherein the unlocking access to the application running of the handheld device includes unlocking access to the application running on the handheld device based on the at least one characteristics of the virtual keyboard.

8. The method of claim 1, wherein the detecting a change in the position of a handheld device relative to the given plane includes changing a position in at least a first direction and then in changing position a second direction within a plane.

9. The method of claim 8, wherein the unlocking access to the application running of the handheld device is based on the at least one an amplitude and frequency of changing the position of the handheld device in the first direction and the second direction.

10. The method of claim 1, wherein the detecting a change in the position of a handheld device relative to the given plane includes rotating the handheld device in at least a first direction and then in a second direction about an axis normal to a display.

11. The method of claim 10, wherein the unlocking access to the application running of the handheld device is based on the at least one an amplitude and frequency of rotating the position of the handheld device in the first direction and the second direction.

12. The method of claim 1, wherein the detecting the change in the position of the handheld device relative to the given plane includes detecting a change in position in a plurality of planes.

* * * * *